Sept. 21, 1937. C. BERNSTEIN 2,093,901
MEANS FOR APPLYING ADHESIVE
Filed March 9, 1936 2 Sheets-Sheet 1

INVENTOR
CHARLES BERNSTEIN
BY
ATTORNEY

Sept. 21, 1937. C. BERNSTEIN 2,093,901
MEANS FOR APPLYING ADHESIVE
Filed March 9, 1936 2 Sheets-Sheet 2

INVENTOR
CHARLES BERNSTEIN
BY
ATTORNEY

Patented Sept. 21, 1937

2,093,901

UNITED STATES PATENT OFFICE 2,093,901

MEANS FOR APPLYING ADHESIVE

Charles Bernstein, Brooklyn, N. Y.

Application March 9, 1936, Serial No. 67,814

11 Claims. (Cl. 91—43)

The present invention relates to means for applying adhesive to strips of material such as pipings utilized for ornamenting ladies' shoes and other articles.

Pipings used for shoe ornamentation are usually initially secured in place between portions of the shoe upper material by means of an adhesive in fluid or plastic condition. The application of the adhesive to the piping has heretofore been accomplished usually by immersing a roll or bunch of the piping in the adhesive or by applying the adhesive coating to the piping by means of a brush. These methods are objectionable because, among other things, the adhesive covers the entire surface of the piping and stains or discolors the latter, whereas it is necessary only to apply the adhesive to the part of the piping which is not visible in the finished shoe or other article. The main object of the present invention, therefore, is to obviate the objections and disadvantages of the prior art methods of applying adhesive to strips of piping or similar material.

Piping used for ornamenting shoes is usually positioned between portions of the shoe upper as, for example, between the vamp and the quarter, so that only a marginal edge portion of the piping is visible in the finished shoe. Such pipings are usually of the beaded edge type or of the type which has a folded marginal edge portion which is the edge portion of the piping that is visible. As stated, it is unnecessary to apply adhesive to the portion of the piping which will be visible in the finished shoe; on the other hand, the application of adhesive to such visible portion of the piping is undesirable for the reasons hereinbefore mentioned. Accordingly, another object of the present invention is to provide means for applying adhesive to piping or similar material in such manner that a marginal edge portion thereof is free of the adhesive, and a further object of the invention, in this connection, is to provide means for predetermining the width of the piping to be coated with the adhesive and to prevent the adhesive from reaching the portion of the piping which it is desired to be free of the adhesive.

The adhesive usually employed for attaching pipings to shoe uppers is a rubber cement, the characteristics of which are well known to those skilled in the art. One characteristic of such rubber cement is that it is deleteriously affected by exposure to the atmosphere. Another object of the present invention, therefore, is to provide an adhesive applicator for use with rubber cement, constructed to greatly minimize, if not prevent, the exposure of the cement to the atmosphere prior to the application of the cement to the material to be coated therewith.

A yet further object of the invention is generally to facilitate the application of an adhesive to piping and other strips of material.

The above objects of the invention and other objects ancillary thereto will best be understood from the following description read in connection with the accompanying drawings.

Figure 1:
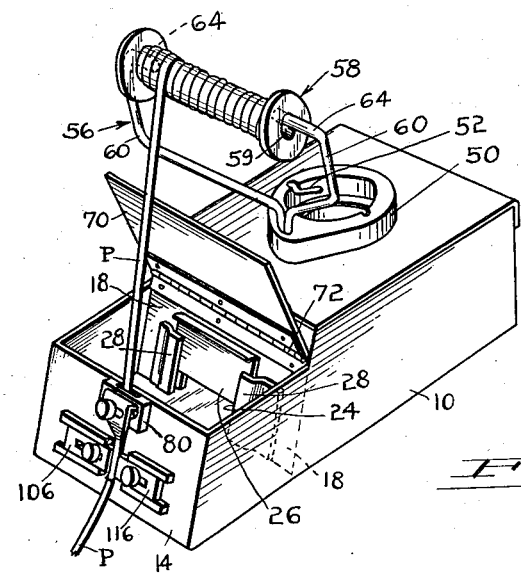
Fig. 1 is a perspective view of an adhesive applicator embodying the present invention, showing the cover of the distribution compartment open for the sake of clearness in illustration.
Figure 2:
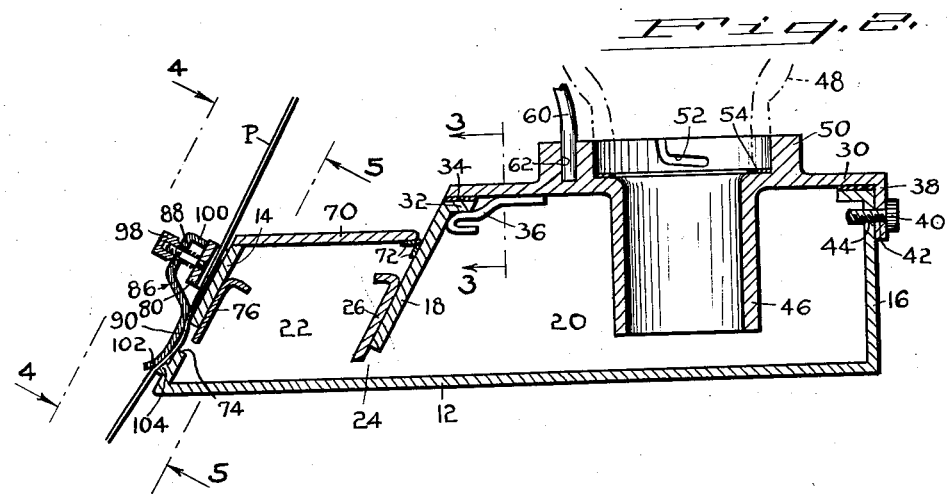
Fig. 2 is a longitudinal sectional view of the applicator.
Figure 3:
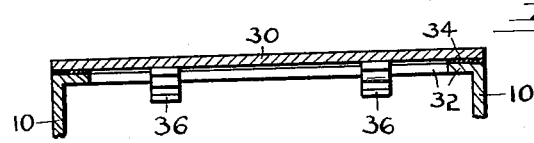
Fig. 3 is a sectional view on the line 3—3 of Fig. 2.
Figure 4:
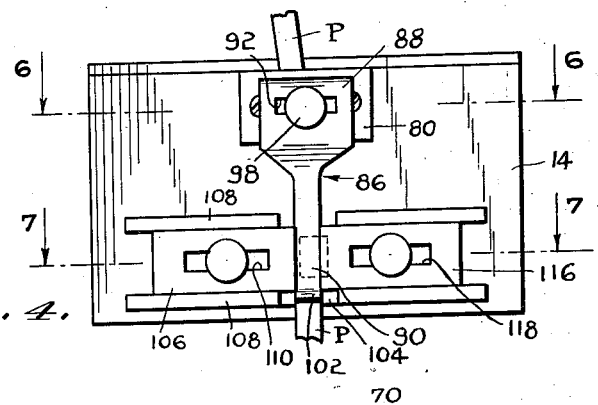
Fig. 4 is a front view in elevation of the applicator shown in Fig. 1, on the line 4—4 of Fig. 2.
Figure 5:
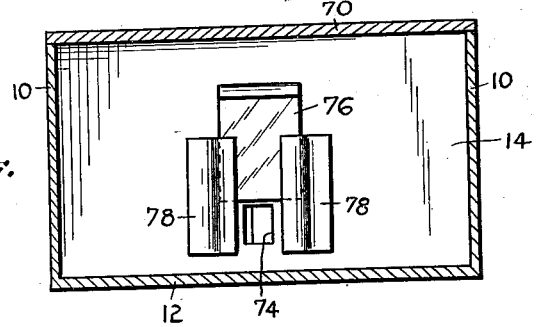
Fig. 5 is a sectional view on the line 5—5 of Fig. 2.
Figure 6:
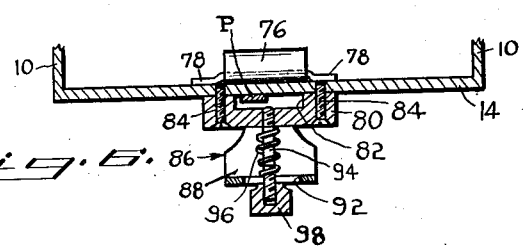
Fig. 6 is a sectional view on the line 6—6 of Fig. 4.

Referring to the drawings in detail, the applicator comprises a receptacle having side walls 10, a bottom wall 12, a front wall 14, and a rear wall 16. The receptacle is divided by means of a partition 18 into a supply compartment 20 and a distribution compartment 22. The partition 18 has an opening 24 through which the adhesive may pass from the supply compartment 20 to the distribution compartment 22. A sliding valve or gate 26 is movably mounted in guideways 28 secured to the partition 18, and may be raised and lowered in said guideways to uncover and cover said opening 24.

The supply compartment 20 is provided with a cover 30 which engages an inner peripheral flange 32 formed at the upper edges of the walls of the compartment 20, and is seated on a gasket 34 to provide a substantially air-tight seal between the cover and said flange 32. Spring fingers 36 are secured to the under-surface of the cover 30 adjacent the forward edge thereof and are constructed and arranged to engage below the flange 32 adjacent the partition 18, and thereby exert pressure on the cover 30 to retain the latter in tight engagement with the gasket 34. The rear end of the cover is provided with a depending flange 38 which overlies the upper end of the rear wall 16 and is secured to the latter by means of a screw 40 which passes through aligned screw-threaded apertures 42 and 44 in said flange 38 and wall 16, respectively, thus securing the cover in position in fluid-tight engagement with the receptacle, and at the same time facilitating removal of the cover. A tube 46 depends from the cover 30 into the compartment 20 and terminates at its lower end at a relatively short distance from the bottom wall 12 of said compartment. Said tube constitutes means to form a seal to regulate the flow of the adhesive from the inverted container 48 and also, prevents or greatly minimizes the access of air to the adhesive in the compartment 20. The cover 30 is provided with an upstanding flange 50 in alignment with the upper end of the tube 46. Said flange is provided with a plurality of bayonet slots 52 which cooperate with projections on the adhesive container 48 for obtaining a quick detachable connection between said container and the adhesive receptacle. The gasket 54 is seated within the flange 50 and is engaged by the mouth of the inverted container 48, forming a fluid-tight joint therewith.

A support 56 for the spool 58 on which the piping is wound is mounted on the cover 30. Said support comprises arms 60 secured at their lower ends within an opening 62 provided in the flange 50. The upper ends of said arms have inturned end portions 64 which may engage the sides of the spool 58 or, as here shown, extend for a short distance into the hollow cylindrical portion 59 of said spool. A cover 70 for the distribution compartment is pivotally connected to the partition 18 by means of a hinge 72.

The adhesive in the distribution compartment 22 is applied to the piping through an opening 74 in the front wall 14 adjacent the bottom wall 12 of the receptacle. A gate valve 76 for covering and uncovering said opening is slidable on the inner surface of said wall in guideways 78 soldered or otherwise secured to the inner surface of the wall. An important feature of the present invention resides in the provision of means for guiding the piping for movement across said opening for the application of adhesive thereto. A block 80 having a groove 82 is secured in any suitable manner as by screws 84 to the wall 14 adjacent the upper edge of the latter. Said groove 82 is closed by the underlying surface of the wall 14, forming a slot through which the piping P is threaded for directing said piping toward the opening 74. Means are provided for pressing a marginal edge portion of the piping against the wall 14 at one side of the opening 74 as the piping is moved across said opening. Said pressing means comprises a member 86 provided with a head 88 and a finger 90 arranged to bear on the piping. Said head 88 is provided with a slot 92. A threaded lug 94 fixed to the block 80 extends through the slot 92 in engagement with the opposite side edges of said slot, permitting lateral adjustment of the presser member 86 in relation to the opening 74. A coiled compression spring 96 is disposed on the lug 94 in position to bear on the opposed surfaces of the block 82 and the presser head 88. A nut 98 is threaded on the lug 94 and bears on the head 88 to secure the presser member 86 in adjusted position. Said nut also constitutes means to regulate the pressure of the finger 90 on the piping P, and for this purpose, cooperates with the head 88 and the spring 96 and, more particularly, with a flange 100 which bears on the block 80 when the nut 98 is threaded down. The lower free end of the finger 90 has an upwardly-curved portion 102 which overlies an inclined ledge 104 on the wall 14 adjacent the lower edge of the opening 74, forming a smooth passage for the piping as it is drawn across said opening and beneath the presser member 86. The inclined ledge 104 also serves to remove excess adhesive from the surface of the piping as the latter is drawn thereacross in engagement therewith.

The means for guiding the strip of piping across the opening 74 also includes means for determining the width of the marginal edge of the piping which is to be free of adhesive. Said means comprises a block 106 slidably mounted on the wall 14 in guideways 108 soldered or otherwise secured to said wall. Said block is provided with a slot 110, and a threaded lug 112 is secured to the wall 14 and projects through said slot for engagement by a threaded nut 114 which bears on the block 106 to secure the latter in adjusted position. Said block is movable toward and away from one side 75 of the opening 74. Another block 116, similar in all respects to the block 110, is also mounted on the front wall 14 and is movable toward and away from the opposite side edge 77 of the opening 74. Said block 116 is provided with a slot 118 and may be secured in adjusted position by means of a nut 120 engageable with a threaded lug 122 fixed to the front wall 14 and arranged to project through the slot 118.

Figure 7:
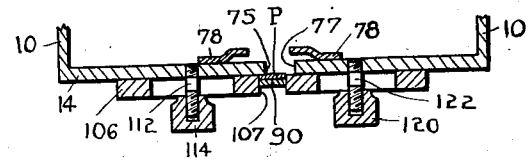
Fig. 7 is a sectional view on the line 7—7 of Fig. 4.

As best shown in Fig. 7, the width of the marginal edge portion of the piping P to be free of the adhesive is predetermined by positioning the block 106 so that the edge 107 thereof is disposed at a definite distance from the edge 75 of the opening 74. The presser 88 is adjusted laterally of the opening so that one side edge of the presser finger 90 abuts said edge 107 of the block 106. The other block 116 is adjusted so that the opposite edge of the presser finger 90 abuts or is close to the adjacent edge of the block. Thus, in effect, a guide channel is formed by the confronting edges of the blocks, by the underlying portions of the wall 14 including the ledge 104, and by the overlying presser finger 90. The pressure on the finger 90 is regulated by the nut 98 depending upon the amount of adhesive desired on the portion of the piping to be coated therewith, less adhesive being applied to the piping as more pressure is exerted by the finger on the piping as it passes between the finger and the ledge 104. The presser member bearing on the piping causes the marginal edge portion thereof, in engagement with the underlying portion of the wall 14 between the opening edge 75 and the block edge 107, to form a seal which prevents the adhesive from reaching said marginal edge portion of the piping, while the remaining width of the piping between the opening edge 75 and the edge of the piping removed therefrom is coated with the adhesive.

Thus, it is seen that the apparatus herein shown and described is well adapted to accomplish the several objects of the present invention. It will be understood, however, that certain changes in the construction and arrangement of parts may be made and that certain features of the invention may be used without others. Therefore, I do not wish to be limited to the precise construction herein shown or described except as may be required by the appended claims considered with reference to the prior art.

Having thus described my invention, what I desire to claim and secure by Letters Patent of the United States is:

1. A device of the class described comprising a receptacle for adhesive, said receptacle having a wall provided with an outlet opening for the passage of adhesive therethrough, means for guiding a strip of material for movement across said opening for the application of adhesive thereto, said wall having an outer uninterrupted surface portion adjacent said opening laterally of an opening edge which extends parallel to the direction of strip movement, and means for pressing a marginal edge portion of the strip against said surface portion of the wall adjacent said opening, whereby to prevent the application of adhesive to said marginal edge portion of the strip.

2. A device of the class described comprising a receptacle for adhesive, said receptacle having a wall provided with an outlet opening for the passage of adhesive therethrough, means for guiding a strip of material for movement across said opening for the application of adhesive thereto including a member mounted on said wall adjacent one side of said opening in position to engage one edge of said strip, a portion of said wall having an outer uninterrupted surface adjacent the edge of said opening which extends parallel to the direction of strip movement and means for pressing a marginal edge portion only of said strip adjacent said edge against said wall portion adjacent said opening, whereby to prevent the application of adhesive to said marginal edge portion of the strip.

3. A device of the class described comprising a receptacle for adhesive, said receptacle having a wall provided with an outlet opening for the passage of adhesive therethrough, means for guiding a strip of material for movement across said opening for the application of adhesive thereto including a member mounted on said wall adjacent one side of said opening in position to engage one edge of said strip, said wall having an outer uninterrupted surface portion adjacent said opening laterally of an opening edge which extends parallel to the direction of strip movement, means for pressing a marginal portion of said strip adjacent said edge against said surface portion of the wall, and another member mounted on said wall adjacent the opposite side of said opening in position to engage the other edge of said strip.

4. A device of the class described comprising a receptacle for adhesive, said receptacle having a wall provided with an outlet opening for the passage of adhesive therethrough, means for guiding a strip of material for movement across said opening for the application of adhesive thereto including a member mounted on said wall adjacent one side of said opening in position to engage one edge of said strip, and means for pressing a marginal portion of said strip adjacent said edge against the wall adjacent said opening, said member being movable toward and away from said side of the opening to adjust the distance between said opening and the adjacent edge of said member for predetermining the width of the marginal edge portion of said strip pressed against the wall.

5. A device of the class described comprising a receptacle for adhesive, said receptacle having a wall provided with an outlet opening for the passage of adhesive therethrough, means for guiding a strip of material for movement across said opening for the application of adhesive thereto including a member mounted on said wall adjacent one side of said opening in position to engage one edge of said strip, and means for pressing a marginal portion of said strip adjacent said edge against the wall adjacent said opening, said member being movable toward and away from said side of the opening to adjust the distance between said opening and the adjacent edge of said member for predetermining the width of the marginal edge portion of said strip pressed against the wall, said other member being movable toward and away from said opposite side of the opening.

6. A device of the class described comprising a receptacle for adhesive, said receptacle having a wall provided with an outlet opening for the passage of adhesive therethrough, means for guiding a strip of material for movement across said opening for the application of adhesive thereto, said wall having an outer uninterrupted surface portion adjacent said opening laterally of an opening edge which extends parallel to the direction of strip movement, means for pressing a marginal edge portion of the strip against said surface portion of the wall adjacent said opening, whereby to prevent the application of adhesive to said marginal edge portion of the strip, and means for adjusting the pressure of said means on the strip.

7. A device of the class described comprising a receptacle for adhesive, said receptacle having a wall provided with an outlet opening for the passage of adhesive therethrough, means for guiding a strip of material for movement across said opening in contact with the wall adjacent thereto, said wall having an outer uninterrupted surface portion adjacent said opening laterally of an opening edge which extends parallel to the direction of strip movement, and means for pressing a marginal edge portion of the strip against said surface portion of the wall adjacent said opening, whereby to prevent the application of adhesive to said marginal edge portion of the strip.

8. A device of the class described comprising a receptacle for adhesive, said receptacle having a wall provided with an outlet opening for the passage of adhesive therethrough, means for guiding a strip of material for movement across said opening in contact with the wall adjacent thereto, said wall having an outer uninterrupted surface portion adjacent said opening laterally of an opening edge which extends parallel to the direction of strip movement, and adjustable spring means for pressing a marginal edge portion of the strip against said surface portion of the wall adjacent said opening, whereby to prevent the application of adhesive to said marginal edge portion of the strip.

9. A device for applying adhesive to the surface of a strip of material, comprising a receptacle for adhesive, said receptacle having a wall provided with an outlet opening for the passage of adhesive therethrough, means for supporting a supply of said strip material for movement across said opening, said wall having an outer uninterrupted surface portion adjacent said opening laterally of an opening edge which extends parallel to the direction of strip movement, and means for pressing a marginal edge portion of said strip against said surface portion of the wall, whereby to prevent the application of adhesive to said marginal edge portion of the strip while adhesive is applied to other surface portions of the strip.

10. A device for applying adhesive to the surface of a strip of material, comprising a receptacle for adhesive, said receptacle having a wall provided with an outlet opening for the passage of adhesive therethrough, means for supporting a supply of said strip material for longitudinal movement across said opening for the application of adhesive to a longitudinally extending surface portion of the strip, and adjustable means for preventing the application of the adhesive to a laterally adjacent longitudinally extending portion of said strip surface while adhesive is applied to said first mentioned surface portion during the movement of the strip across said opening.

11. A device for applying adhesive to the surface of a strip of material, comprising a receptacle for adhesive, said receptacle having a wall provided with an outlet opening for the passage of adhesive therethrough, means for guiding said strip for longitudinal movement across said opening for the application of adhesive to a longitudinally extending surface portion of the strip, and means for preventing the application of the adhesive to a laterally adjacent longitudinally extending portion of said strip surface while adhesive is applied to said first mentioned surface portion during the movement of the strip across said opening.

CHARLES BERNSTEIN.